United States Patent

Horner et al.

[11] 4,296,313

[45] Oct. 20, 1981

[54] GEAR SYSTEM AND METHOD OF ASSEMBLY

[75] Inventors: John A. Horner, 211 Grove St., Kawkawlin, Mich. 48631; Dale W. Wright, Saginaw, Mich.

[73] Assignee: John A. Horner, Kawkawlin, Mich.

[21] Appl. No.: 106,913

[22] Filed: Dec. 26, 1979

[51] Int. Cl.³ .................................................. G06C 25/00
[52] U.S. Cl. .................................................. 235/61 L
[58] Field of Search ............... 235/61 L, 61 M, 94 R, 235/94 A, 61 PA; 74/47, 425, 439, 443, 446, 447

[56] References Cited

U.S. PATENT DOCUMENTS

| | | | |
|---|---|---|---|
| 601,990 | 4/1898 | Suster | 474/47 |
| 3,304,796 | 2/1967 | Leege | 74/439 |
| 3,707,883 | 1/1973 | Kamenick | 474/47 |
| 3,739,892 | 6/1973 | Liberty, Jr. | 74/447 |
| 4,077,274 | 3/1978 | Johnson | 74/425 |

Primary Examiner—L. T. Hix
Assistant Examiner—Benjamin R. Fuller
Attorney, Agent, or Firm—Learman & McCulloch

[57] ABSTRACT

A bevel gear system wherein a plastic adaptor of generally frustoconical shape has convergent teeth formed in a recessed frustoconical surface to snap fit over the bevel gear teeth of a more rigid drive gear and similarly has matching gear teeth on an exterior frustoconical surface in mesh with the teeth of a driven bevel gear, which formerly was driven by the teeth of the more rigid gear, and whose axial position has been changed to mesh with the teeth of the adaptor.

12 Claims, 3 Drawing Figures

GEAR SYSTEM AND METHOD OF ASSEMBLY

BACKGROUND OF THE INVENTION

The invention particularly relates to gear systems, and more particularly to gear mechanism of the type utilized, for instance, to mechanically drive the input shaft of a gasoline station computer to indicate the total price of the liquid dispensed from the gasoline pump. Formerly, when the price per gallon involved two digit numbers, such computers registered "total price" directly, but with the advent of price increases, which have raised the price per gallon over one dollar, gasoline pump computers of the mechanical variety, have not directly registered the correct amount which the customer owes. Rather, it has been customary for the service station attendant to set the pump computer at one-half the price per gallon and then double the amount shown on the register to arrive at the proper figure. To obviate this problem, we have developed a gear adaptor to fit over the existing drive gear and provide twice the number of driving teeth as previously. The gear adaptor is molded of a self-lubricating plastic, such as polyurethane, and enables a price variator to be set at the price per half gallon to compute and register the full price per gallon.

While worm wheel wear rings, having internal teeth and external teeth, such as, for example described in U.S. Pat. No. 4,077,274, have previously been suggested for use in excessive "wear" situations, the novel concepts disclosed by the present invention have never, to our knowledge, previously been utilized to achieve the results sought by the present inventors.

One of the prime objects of the present invention is to provide a direct read-out adaptor system which can be very economically manufactured and marketed.

Another object of the invention is to provide a system of the character described which permits the service station owner to adapt the present mechanical computer in a reliable and rapid manner, without incurring the considerable costs of changing the computer.

SUMMARY OF THE INVENTION

A snap-on plastic adapter gear is fitted over the exterior teeth of the present bevel drive gear on the output shaft of the gallon indicator of a full pump, and has a greater number of teeth on a frustoconical outer wall in ratio with the number of teeth on the gear over which it fits. The driven bevel gear for the price indicator is moved axially to a position in mesh with the gear teeth on the exterior of the plastic adaptor, to be driven thereby.

THE DRAWINGS

DETAILED DESCRIPTION

Figure 1:
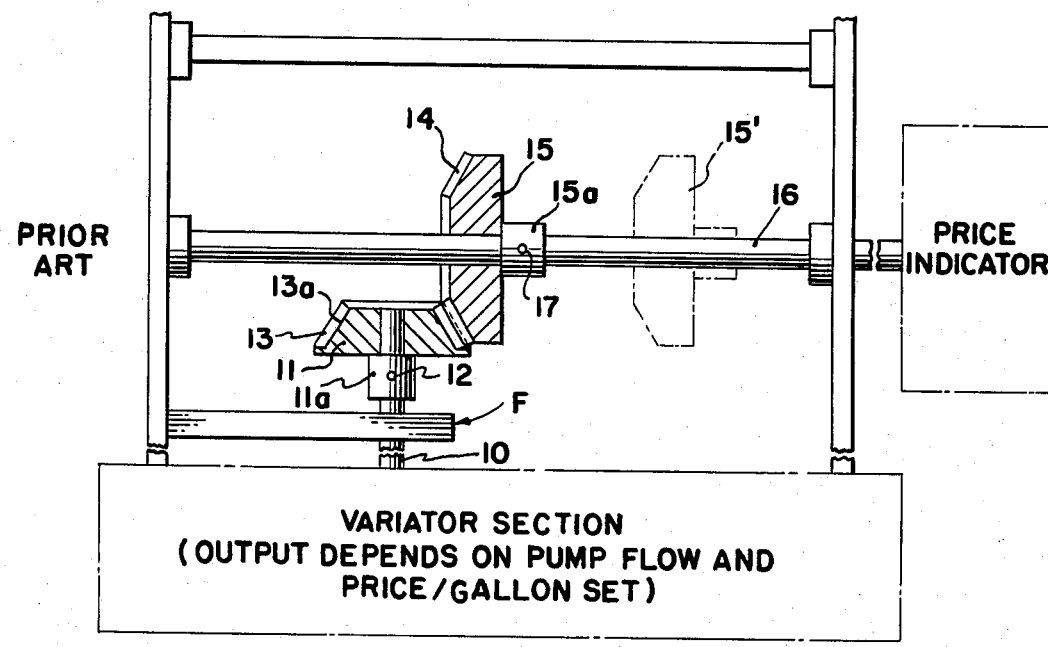
FIG. 1 is a schematic, sectional elevational view indicating the prior art construction.
Figure 2:
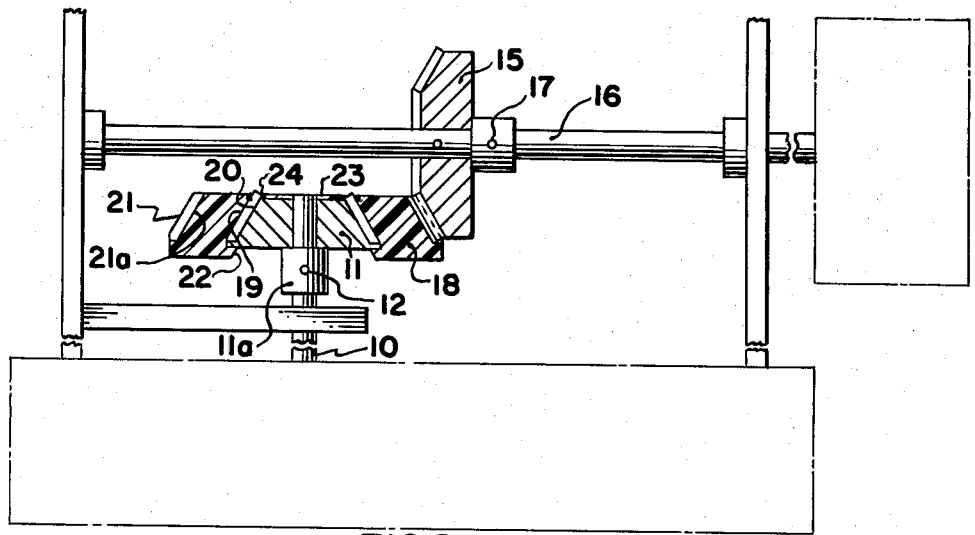
FIG. 2 is a similar view illustrating the new construction altered to correctly indicate the total cost of the gasoline dispensed from the service station pump.
Figure 3:
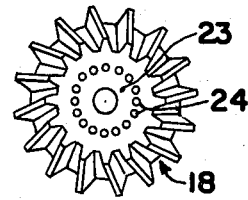
FIG. 3 is a slightly reduced top plan view of the adaptor gear which is employed.

Referring now more particularly to FIG. 1, the output shaft 10 from the price variator, which may be journaled by a framework F, has a rigid, metal first or driving bevel gear 11 with a hub 11a, which may be pinned as at 12 to the shaft as shown.

The frustoconical gear 11 has, as usual, projecting bevel gear teeth 13 provided on its exterior surface which are, as FIG. 1 indicates, normally in mesh with the similar teeth 14 provided on a rigid, metal driven bevel gear 15 mounted on the total sale price indicator input shaft 16. Gear 15 has a hub 15a, which may be pinned as at 17 to the shaft 16 in the usual manner. Typically, the gear 11 and the gear 15 are of different size and one has fifteen teeth which are arranged on a fifteen degree helix in, for instance, left-hand helical formation and the other has twenty-five teeth also arranged on a fifteen degree helix.

A first step in converting the system to directly register prices between one dollar and $1.99 is to remove tapered pin 17 and slide the gear 15 to the remote position indicated at 15′ in FIG. 1. Then the resilient and slightly flexible, typically 55D durometer, adaptor gear 18 is snap-fitted over bevel gear 11. The frustoconical adaptor 18 has an internal cavity 19 provided with a plurality of linear, circumferentially spaced tooth-shaped recesses 20 of a size corresponding to the shape and spacing of teeth 13. The angle of inclination of the recesses 20 corresponds to the angle of inclination of teeth 13 as do the root diameter recesses 13a of gear 11, and the surfaces 20 which are provided on the adaptor 18, to mate with these root diameter surfaces 13a.

Provided exteriorly on adaptor 18, are substantially linear teeth 21 corresponding substantially in size and configuration to the teeth 13 and similarly the root diameter surfaces 21a correspond to the root diameter surfaces 13a. Twice as many teeth 21, i.e. thirty, are provided on the exterior of adaptor 18 as there are recesses 20.

In order to snap fit the adaptor 18 over metal gear 11, the recesses 20 must be initially aligned with teeth 13, and, once the gear 18 is forced downwardly, the deformable flange 22 which projects radially inwardly, will be received under the large diameter surface of gear 11 to securely hold the adaptor 18 in position thereon. The bevel angle of the gear teeth tends to assist the movement of the adaptor 18 down into position, and then the driving torque tends to tighten it.

Provided in the relatively thin top wall 23 of the adaptor 18, are a series of openings 24 into which the ends of gear teeth 13 project when the gear 18 is firmly down in position. The ends of gear teeth 13 will thus visibly project slightly from openings 24 and the installer will realize that the adaptor 18 is firmly down in position. With adaptor 18 installed, gear 15 can now be moved back to a new position on the shaft 16 with its teeth 14 in mesh with the teeth 21 of adaptor 18 and, after drilling a new hole in shaft 16, the securing pin 17 can be reinserted.

The adapter may be molded in a female mold which has teeth indentations for forming teeth 21, using a gear 11 as the core of the mold cavity. Alternatively, and for purposes of obtaining higher volume manufacturing, the adaptor 18 can be injection molded. Whereas previously, the prior art variator section had a 1:1 ratio and indicated the price per gallon set on the service station pump computer, the new system uses the price per half gallon, and the computer registers the full price by utilizing a 2:1 transmission ratio. This is accomplished without any change in, or replacement of, gears 11 and 15.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. An adapter bevel gear for interposition between a driving first bevel gear and a driven second bevel gear normally in mesh with said first gear so as to be driven by the latter at a predetermined speed ratio relative thereto, said adapter gear comprising a body formed of resilient material and having an internal, frustoconical cavity of such size as snugly to accommodate one of said first and second gears, said cavity having tooth-accommodating recesses therein for the snug accommodation of each of the gear teeth of said one of said gears, said adapter gear having a frustoconical exterior provided with teeth of such size as to mesh with those of the other of said first and second gears, the number of said external teeth being greater than the number of tooth accommodating recesses in said cavity, thereby to change said ratio.

2. An adapter gear according to claim 1 wherein said body is formed of a material having greater resilience than that from which said one of said gears is formed.

3. An adapter gear according to claim 1 including means for securing said body to said one of said gears.

4. An adapter gear according to claim 3 wherein said securing means comprises a marginal flange at the larger end of said cavity and overhanging the latter.

5. An adapter gear according to claim 1 wherein said body has a wall at the smaller end of said cavity.

6. An adapter gear according to claim 5 wherein said wall has a plurality of circumferentially spaced openings therein corresponding in number to the number of recesses in said cavity, said openings being in register with said recesses.

7. An adapter gear according to claim 1 wherein the number of said exterior teeth is a whole number multiple of the number of said recesses.

8. An adapter gear according to claim 1 wherein the number of said exterior teeth is twice the number of said recesses.

9. An adapter gear according to claim 1 wherein the teeth of said one of said gears are formed in a helix and where said recesses are formed on a helix corresponding to that of said teeth.

10. A method of providing an increased capability for the input shaft of a gasoline pump total sales price computer or the like wherein a drive bevel gear on the output shaft of the gasoline pump variator section is in mesh with a driven bevel gear mounted on a shaft driving the total sales price indicator to indicate the total sales price of the fuel dispensed comprising;

removing the driven bevel gear from the immediate vicinity of the drive bevel gear;

fitting a resilient frustoconical adaptor with a greater number of external bevel gear teeth than internal teeth receiving recesses axially over the teeth of the drive gear to dispose the teeth of the drive gear snugly in the teeth receiving recesses; and resecuring the driven gear in a different position on said elongate shaft in mesh with the exterior bevel gear teeth on the adaptor.

11. The method of claim 10 wherein the adaptor includes a deformable flange part and the step of fitting includes deforming the flange and snap-fitting it under the larger diameter end of said drive gear.

12. The method of either claims 10 or 11 wherein the adaptor includes openings in a top wall opposite each end of the tooth receiving recesses and the step of fitting includes pushing the ends of said drive gear teeth up into said openings.

* * * * *